J. DAIN.
POWER TRANSMISSION MECHANISM.
APPLICATION FILED APR. 3, 1916. RENEWED FEB. 7, 1919.
1,316,774.
Patented Sept. 23, 1919.
3 SHEETS—SHEET 1.
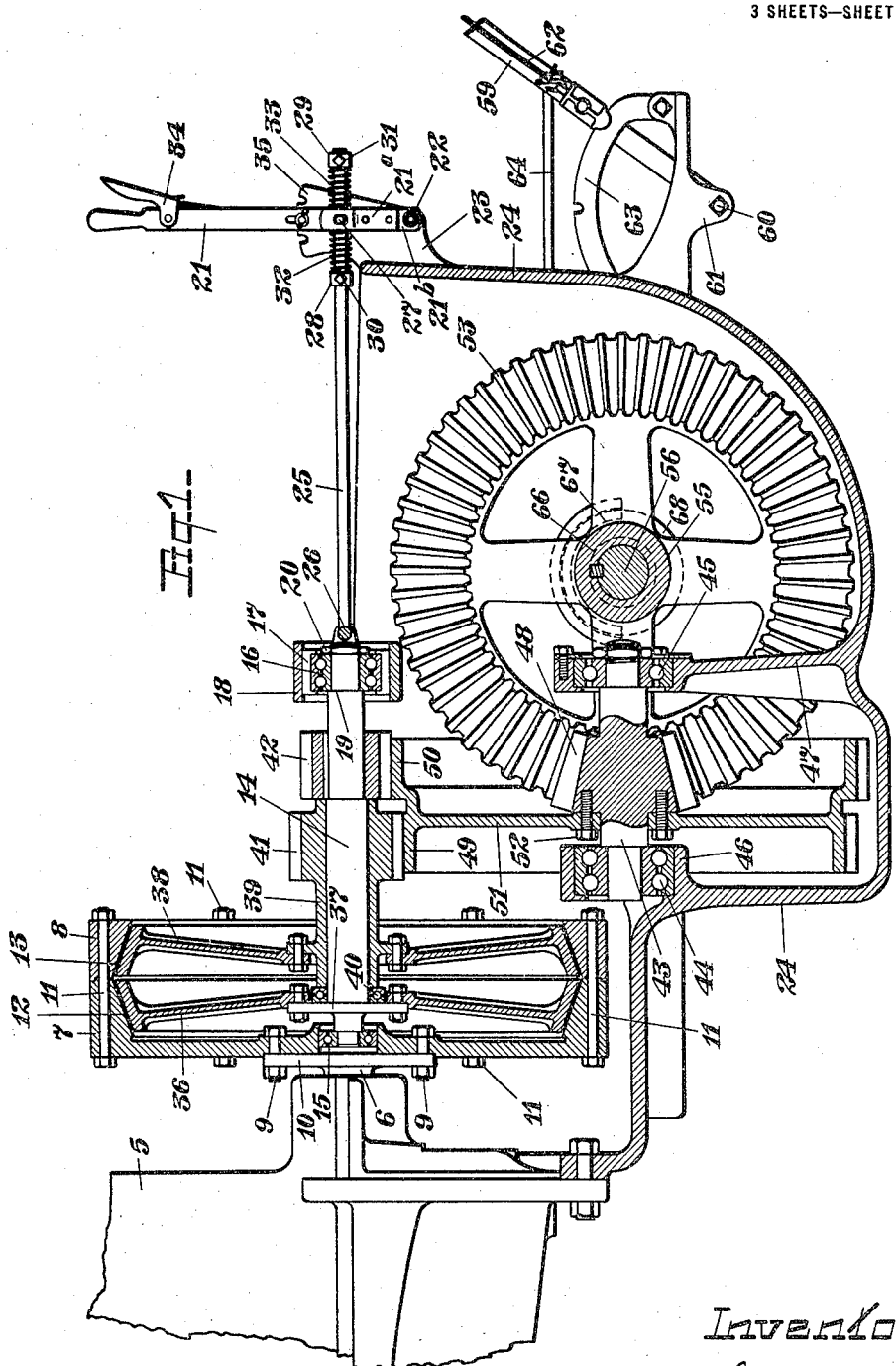

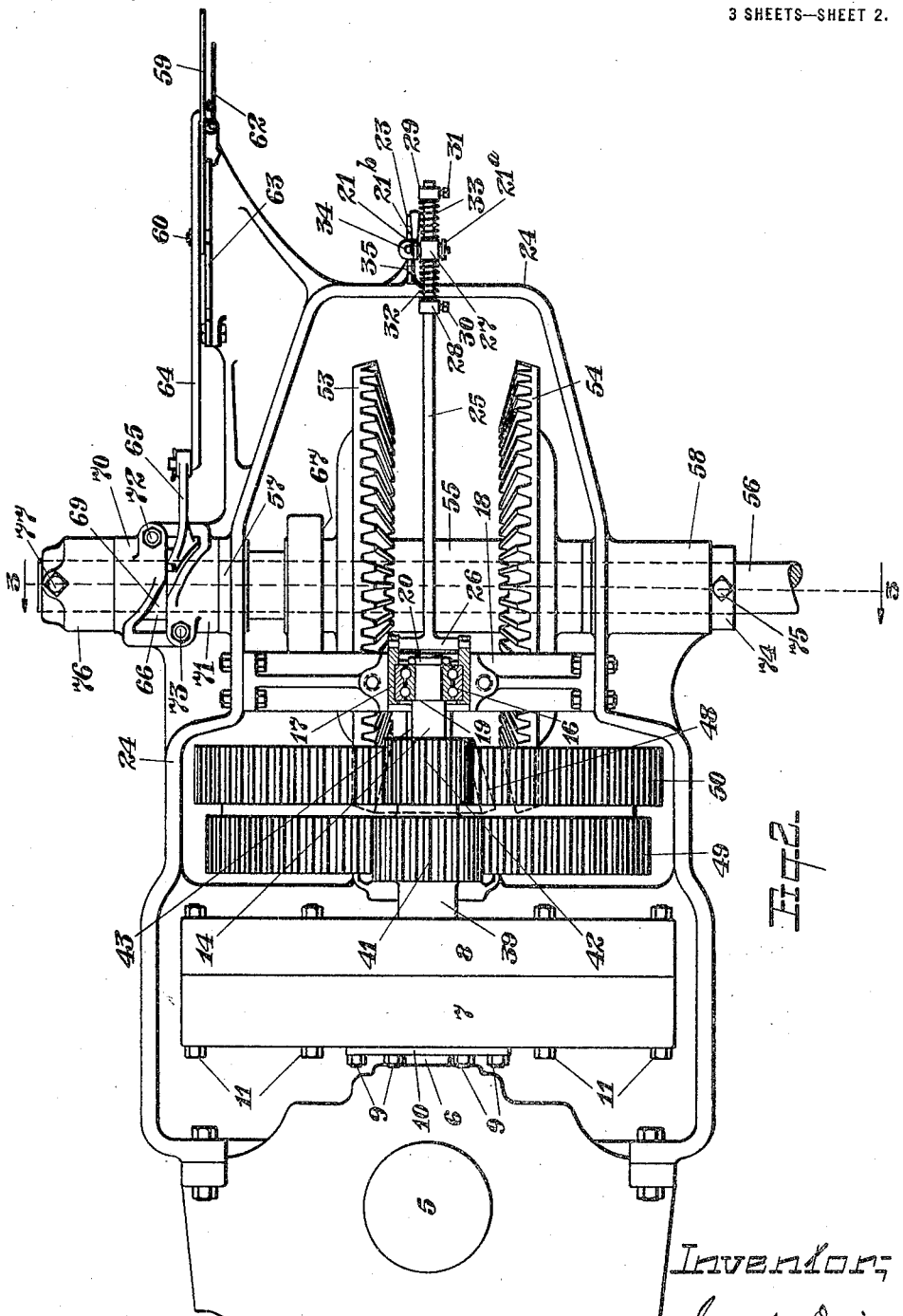

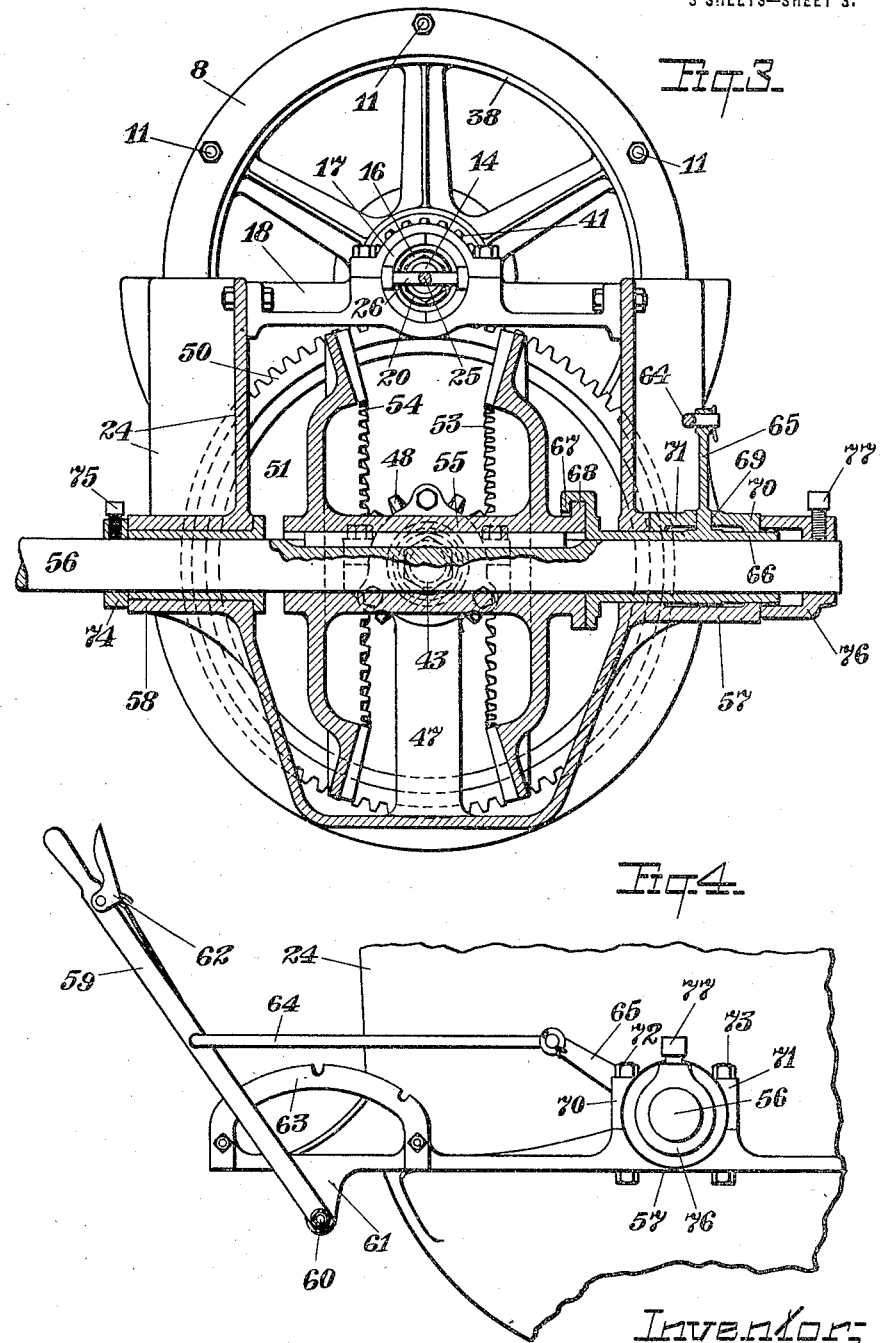

UNITED STATES PATENT OFFICE.

JOSEPH DAIN, OF MOLINE, ILLINOIS, ASSIGNOR TO DEERE AND COMPANY, OF MOLINE, ILLINOIS.

POWER-TRANSMISSION MECHANISM.

1,316,774.  Specification of Letters Patent.  Patented Sept. 23, 1919.

Application filed April 3, 1916, Serial No. 88,553. Renewed February 7, 1919. Serial No. 275,676.

*To all whom it may concern:*

Be it known that I, JOSEPH DAIN, a citizen of the United States, and a resident of Moline, in the county of Rock Island and State of Illinois, have invented certain new and useful Improvements in Power-Transmission Mechanism, of which the following is a specification, reference being had to the accompanying drawings.

My invention relates to the transmission of power, and has for its object to provide improved mechanism for that purpose, but more particularly to provide improved power transmission mechanism suitable for use in motor vehicles, especially motor vehicles of the slow-moving type, such as tractors and heavy trucks. It is desirable to provide vehicles of the latter type with transmission mechanism capable of giving two variations in speed in a forward direction and one speed in reverse, but the transmission mechanism heretofore devised for such vehicles has not been satisfactory with regard to the mechanism for changing the speed owing to the fact that in these heavy vehicles, and particularly in the case of tractors, there is insufficient momentum to carry the tractor along during the interval required for changing speed, and consequently in endeavoring to make speed changes the operator frequently would "kill" his engine. Furthermore, where speed changes involve a shifting of connections between a clutch-driven gear and a gear connected with the traction-wheels of the vehicle, the time interval required for changing the speed is not only prolonged by the necessity of throwing out the clutch before shifting gears, but also by the necessity of making engagement between a moving gear and a stationary one, since the clutch-driven gear must come to rest before it can be moved into engagement with the stationary gear connected to the traction-wheels. Consequently, except under very favorable conditions, there is always danger of killing the engine when shifting from low or first speed to high or second speed, even where the vehicle develops a little momentum.

By the invention which forms the subject-matter of this application I avoid the objections incident to prior constructions by providing for changing from first to second speed without any appreciable interval, and consequently without appreciably reducing the speed of the vehicle, thereby avoiding the danger of killing the engine. The mechanism by which this result is accomplished has the further advantage that shifting of gears to secure speed changes in a given direction is avoided, and consequently wear and tear on the gearing are greatly reduced. A still further advantage is that my improved mechanism provides the same speed changes on the reverse as in a forward direction, and consequently the vehicle can be more readily and quickly handled. In addition to these more notable features of improvement, my invention also provides a very simple but efficient power transmission mechanism which is well adapted to be applied to tractors even of very small size, and one in which the parts are not only few but are readily accessible, and in other respects are well adapted to be properly used and cared for by persons inexperienced in handling machinery.

In the accompanying drawings I have illustrated my improved transmission mechanism applied to an internal combustion motor and arranged for use in a tractor, but I have not deemed it necessary to illustrate the tractor itself, as it will be understood that the driven shaft illustrated may be employed to communicate power to the traction-wheels in any suitable way, as by sprocket-wheels and chains of the usual type. I wish it to be understood, further, that while my improved transmission mechanism is designed more especially for use with tractors and similar vehicles, and is therefore described as applied to such vehicles, it may also be employed for any other purpose for which it is adapted.

In the accompanying drawings,—

Figure 1 is a central longitudinal vertical section of the transmission mechanism;

Fig. 2 is a plan view thereof, some parts being in section;

Fig. 3 is a vertical cross-section on line 3—3 of Fig. 2, looking to the left but with the beveled gears shifted into neutral position; and Fig. 4 is a detail, illustrating the reversing lever and its connections.

Referring to the drawings,—

5 indicates a motor, preferably of the type such as are commonly used on automobiles, and having the usual crank-shaft 6 carrying a fly-wheel at its rear end. 7—8 indicate two circular members which together constitute the fly-wheel. The member 7 is rigidly secured to the crank-shaft 6 by bolts 9 which connect it with a flange or head 10 at the inner end of the crank-shaft, as shown in Fig. 1. The member 8 is rigidly connected with the member 7 by bolts 11 which pass through the peripheral portions of said members 7—8, as shown. The purpose of making the fly-wheel in two parts as described is to permit the parts of the mechanism to be assembled, as will hereinafter appear. As best shown in Fig. 1, the fly-wheel member 7 is provided with an internal clutch surface 12 which is inclined, its greatest diameter being at the rear margin of the member 7; and the fly-wheel member 8 is also provided with a similar internal clutch surface 13 disposed oppositely to the clutch surface 12, so that the two clutch surfaces 12—13 meet at an obtuse internal angle.

14 indicates a shaft disposed concentrically with reference to the fly-wheel, its forward end being mounted in a ball-bearing 15 mounted at the center of the fly-wheel member 7 adjacent to the flange 10. In the construction shown this ball-bearing 15 is adapted to be shifted slightly toward and from the flange 10 as the shaft 14 is adjusted longitudinally in the manner hereinafter described. The rear end of the shaft 14 is mounted in a ball-bearing 16 which is mounted in a frame 17 adapted to slide longitudinally in bearings provided in a transverse beam 18, best shown in Fig. 2. As shown in Fig. 1, the ball-bearing 16 abuts at one side against a shoulder 19 provided on the shaft 14 and at the other side against a collar 20 screwed upon the rear end of the shaft, so that the ball-bearing is secured against movement endwise upon the shaft 14. The ball-bearing 16 is secured against movement independently of the frame 17 by providing grooves in said frame to receive the said bearing, as shown in Fig. 2, and consequently, by moving the frame 17 endwise of the machine, it will be evident that the shaft 14 may be shifted longitudinally of itself. This movement of the frame 17 and of the shaft 14 is accomplished by means of a lever 21 which is pivoted upon a suitable support 22 journaled in a bracket 23 or other suitable support. In the construction shown the bracket 23 is carried by a housing 24 which supports and incloses certain parts of the mechanism, as will be hereinafter described. The lever 21 is connected with the frame 17 by a connecting-rod 25, the forward end of which carries a transverse pin 26 pivotally connected with the opposite sides of the frame 17, as best shown in Fig. 2. The rear end of the rod 25 passes through a block 27 pivotally carried by the lever 21, the lower portion of which is preferably made of two separated members 21$^a$—21$^b$, as shown in Fig. 2, so that the block 27 may be mounted between them. 28—29 indicate collars mounted on the rod 25 at opposite sides of the lever 21 and held in place by set-screws 30—31, respectively. 32 indicates a spring between the block 27 and the collar 28, and 33 a similar spring between the block 27 and the collar 29. By adjusting the collars 28—29 the tension of the springs 32—33 may be adjusted. It will be evident that by the construction described if the lever 21 be moved forward the rod 25 will be yieldingly moved in the same direction, thereby moving the ball-bearing supporting frame 17 forward and carrying with it the shaft 14. If the lever 21 be moved backward from its neutral position shown in Fig. 1, the shaft 14 will be correspondingly drawn back and held yieldingly in such position. The lever 21 is provided with the usual latch 34 and segment 35 by which it may be locked in a neutral position or in either of its other positions. 36 indicates a clutch member which is rigidly connected with the forward end of the shaft 14 by being bolted to an annular flange 37 provided near the forward end of said shaft. The clutch member 36 is adapted to coöperate with the clutch surface 12 of the fly-wheel 7 when the shaft 14 is in its extreme forward position. When the shaft is partly withdrawn, to the neutral position shown in Fig. 1, the clutch member 36 does not operatively engage the clutch surface 12. 38 indicates a clutch member adapted to coöperate with the clutch surface 13 of the fly-wheel member 8 when the shaft 14 is drawn back from its neutral position. The clutch member 38 is rigidly secured to a sleeve 39 loosely mounted on the shaft 14, its forward end being arranged to bear against a ball-bearing 40 provided immediately back of the flange 37, as shown in Fig. 1. This ball-bearing takes the end thrust of the sleeve 39 when the shaft 14 is drawn back to bring the clutch member 38 into engagement with the clutch surface 13. 41 indicates a pinion carried by the sleeve 39 and preferably formed integral therewith. 42 indicates a smaller pinion mounted on and keyed to the shaft 14 adjacent to the pinion 41.

43 indicates a driven member, which, in the construction illustrated, is a short counter-shaft arranged below and parallel with the shaft 14 and mounted in ball-bearings 44—45 supported by brackets 46—47, respectively, carried by the housing 24. The shaft 43 carries a beveled pinion 48, preferably formed integral therewith, and high and low speed gears 49—50, respectively, preferably cast integral with each other and connected to the shaft 43 by a common radial web 51, as best shown in Fig. 1. This web, in the construction shown, is secured by bolts 52 to the outer face of the beveled pinion 48. It will be understood that while these details of construction in themselves are valuable features of my invention, my invention as to its generic features does not essentially involve many of the details of construction which are shown and described, as will be apparent from the claims hereinafter made.

From the foregoing description it will be evident that when the clutch member 36 operatively engages the clutch surface 12 the shaft 14 will be rotated, rotating the low speed pinion 42. This rotates the countershaft 43 and beveled pinion 48 through gear 50. At the same time gear 49 rotates and causes pinion 41, sleeve 39, and clutch member 38 to rotate idly, said clutch member being then out of engagement with the clutch surface 13. If the shaft 14 is drawn back to move clutch member 38 into operative engagement with the clutch surface 13, the sleeve 39 and high speed pinion 41 are driven, driving the countershaft 43 and beveled pinion 48 through gear 49. When this occurs low speed pinion 42, shaft 14 and clutch member 36 are also driven through gear 50, but clutch member 36 rotates idly since it is then not in operative engagement with clutch surface 12. It will be noted that these speed changes are accomplished without any shifting of gears, since the pinion 41 is always in mesh with the gear 49 and the pinion 42 is always in mesh with the gear 50, the speed changes being effected simply by shifting the shaft 14 to move one or the other of the clutch members 36—38 into operative relation with the clutch surface of the fly-wheel arranged to coact therewith. Inasmuch as the engagement of the clutch members is a frictional one and not a positive one and there is no meshing of gears to be done, it will be apparent that the shifting from low to high speed, or vice versa, may be accomplished instantly, so that there is no appreciable interval during which stoppage of the machine may occur, and consequently there is no danger of killing the engine.

As best shown in Fig. 3, the beveled pinion 48 is mounted between two similar oppositely-disposed beveled gears 53—54, which are preferably cast integral with each other and connected by a sleeve 55. This sleeve is mounted upon a shaft 56, which may be termed the driven shaft, since it is the shaft through which, by means of suitable connections, as by sprocket-wheels and chains, the traction-wheels are driven. The shaft 56 is mounted in suitable sleeves 57—58 provided at opposite sides of the housing 24, and the gears 53—54 are keyed to said shaft but are movable longitudinally thereupon so that one or the other of them may be brought into mesh with the beveled pinion 48. Thus, when one of said beveled gears engages the pinion 48, the shaft 56 is rotated in one direction, and when the other beveled gear engages said pinion, the shaft is rotated in the opposite direction,—in each case the speed of the shaft being determined by the relation of the clutch members 36—38 to their respective coacting clutch surfaces 12—13. The beveled gears 53—54 are shifted longitudinally on the shaft 56 by means of a lever 59 fulcrumed at 60 upon a bracket 61, or other suitable support, and provided with the usual latch 62 and segment 63 for locking it in its different positions. The lever 59 is connected by connecting-rod 64 with an arm 65 projecting from a rocking sleeve 66 loosely mounted on the shaft 56 within the sleeve 57. At its inner end the sleeve 66 carries a hook 67 which engages an annular flange 68 connected with the hub of the beveled gear 53. Consequently by shifting the sleeve 66 endwise the gears 53—54 may be moved lengthwise of the shaft 56. Endwise movement of the sleeve 66 for this purpose is effected by extending the arm 65 through an inclined slot 69 formed in plates 70—71 fitted into an opening at the upper side of the sleeve 57 and secured by bolts 72—73, as best shown in Figs. 2 and 3. By this construction, by swinging the arm 65 backward, the sleeve 66 is moved to the left, viewed on Fig. 3, thereby bringing beveled gear 53 into engagement with beveled pinion 48; and by swinging the arm 65 forward, sleeve 66 is moved to the right, viewed on Fig. 3, moving beveled gear 54 into engagement with beveled pinion 48. The direction in which the shaft 56 is rotated may therefore readily be controlled by means of the lever 59.

74 indicates a collar mounted on the shaft 56 at the outer end of the sleeve 58 and secured by a set-screw 75 for holding said shaft against endwise movement to the right, as viewed on Fig. 3; and 76 indicates a collar mounted upon the shaft 56 at the opposite side of the housing, and bearing against the outer end of the sleeve 57, for holding the shaft 56 against movement in the opposite direction. The sleeve 76 is secured to the shaft 56 by a set-screw 77. The collar 76 is recessed as shown to permit the necessary endwise movement of the sleeve 66. In assembling the clutch mechanism the clutch members 36—38 are assembled and associated with fly-wheel member 7, after which the fly-wheel member 8 is put in place and firmly secured to the fly-wheel member 7. The two members of the fly-wheel thus limit the extent to which the shaft 14 may be moved in either direction. The relation of these parts to each other is such that only a very slight movement is necessary to move either clutch member out of operative engagement with the corresponding clutch surface of the fly-wheel into its neutral position, and consequently the movement of the shaft necessary to change from one speed to another is also very little and may be effected practically instantaneously, with the advantages hereinbefore pointed out. In fact, it has been demonstrated by practical tests with a tractor in which the driven shaft was connected with the traction-wheels by sprocket chains that there is no appreciable slacking of the drive chains during the shift from low to high speed. When it is considered that in any power tractor heretofore constructed the progress of the machine stops if the power be disconnected from the wheels for even the short interval required to change gears, it will be apparent that by avoiding the necessity of shifting gears and providing efficient mechanism for changing speed without suspending the application of power for any appreciable interval, I have accomplished a very desirable and improved result in machines of this character.

That which I claim as my invention, and desire to secure by Letters Patent, is,—

1. In a power transmission device, the combination of a rotatable element having two internal oppositely-disposed clutch surfaces, two clutch members adapted to coact with said clutch surfaces, respectively, pinions of different diameters constantly connected with said clutch members, respectively, means for operatively connecting either of said clutch members with said rotatable element, gears constantly connected together to rotate in unison and constantly in mesh with said pinions, respectively, and a driven member connected to said gears, whereby speed changes of the driven member may be effected without gear shifting.

2. In a power transmission device, the combination of a rotatable element having two internal oppositely-disposed clutch surfaces, two clutch members adapted to coact with said clutch surfaces, respectively, pinions of different diameters constantly connected with said clutch members, respectively, means for moving said clutch members in unison to operatively connect one or the other of them with said rotatable element, gears constantly connected together to rotate in unison and constantly in mesh with said pinions, respectively, and a driven member connected to said gears, whereby speed changes of the driven member may be effected without gear shifting.

3. In a power transmission device, the combination of a rotatable element having two internal oppositely-inclined clutch surfaces the adjacent margins of which come together to form an obtuse internal angle with each other, two clutch members adapted to coact, respectively, with one or the other of said clutch surfaces, pinions of different diameters constantly connected with said clutch members, respectively, gears constantly connected together to rotate in unison and constantly in mesh with said pinions, respectively, a driven member connected to said gears, and means for operatively connecting said rotatable element with one or the other of said clutch members.

4. In a power transmission device, the combination of a rotatable element having two internal oppositely-inclined clutch surfaces the adjacent margins of which come together to form an obtuse internal angle with each other, two clutch members adapted to coact, respectively, with one or the other of said clutch surfaces, pinions of different diameters constantly connetced with said clutch members, respectively, gears constantly connected together to rotate in unison and constantly in mesh with said pinions, respectively, a driven member connected to said gears, and means for moving said clutch members in unison to operatively connect one or the other of them with said rotatable element.

5. In a power transmission device, the combination of a rotatable element comprising two cylindrical members connected together to form two internal oppositely-inclined clutch surfaces, two clutch members mounted in said rotatable element and adapted to coact, respectively, with one or the other of said clutch surfaces, pinions of different diameters constantly connected with said clutch members, respectively, gears constantly connected together to rotate in unison and constantly in mesh with said pinions, respectively, a driven member connected to said gears, and means for moving said clutch members in unison to operatively connect one or the other of them with said rotatable element.

6. In a power transmission device, the combination of a rotatable element having two internal oppositely-disposed clutch surfaces, a longitudinally-movable shaft in axial alinement with said rotatable element, two clutch members movable longitudinally with said shaft and adapted to coact, respectively, with one or the other of said clutch surfaces, pinions of different diameters constantly connected with said clutch members, respectively, gears constantly connected together to rotate in unison and constantly in mesh with said pinions, respectively, a driven member connected to said gears, and means for moving said shaft longitudinally to connect said rotatable element with one or the other of said clutch members.

7. In a power transmission device, the combination of a rotatable element having two internal oppositely-disposed clutch surfaces, a longitudinally movable shaft in axial alinement with said rotatable element, two clutch members adapted to coact, respectively, with one or the other of said clutch surfaces and movable with said shaft to operatively connect said rotatable element with one or the other of said clutch members, pinions of different diameters constantly connected with said clutch members, respectively, gears constantly connected together to rotate in unison and constantly in mesh with said pinions, respectively, and a driven member connected to said gears, whereby speed changes of the driven member may be effected by moving said shaft longitudinally without gear shifting.

8. In a power transmission device, the combination of a rotatable element having two internal oppositely-disposed clutch surfaces, a longitudinally-movable rotary shaft in axial alinement with said rotatable element, two clutch members mounted on said shaft and adapted to coact respectively, with one or the other of said clutch surfaces, one of said clutch members being connected to rotate with said shaft and the other of said clutch members being loosely mounted on said shaft, both of said clutch members being movable longitudinally with said shaft, pinions of different diameters constantly connected with said clutch members, respectively, gears constantly connected together to rotate in unison and constantly in mesh with said pinions, respectively, a driven member connected to said gears, and means for moving said shaft longitudinally.

9. In a power transmission device, the combination of a rotatable element having two internal oppositely-disposed clutch surfaces, a longitudinally-movable rotary shaft in axial alinement with said rotatable element, two clutch members adapted to coact, respectively, with one or the other of said clutch surfaces and movable longitudinally with said shaft, one of said clutch members being connected to rotate with said shaft and the other being arranged to rotate independently thereof, longitudinally-movable bearings for the end portions of said shaft, means for moving said shaft longitudinally, pinions of different diameters constantly connected with said clutch members, respectively, and gearing constantly in mesh with said pinions.

10. In a power transmission device, the combination of a rotatable element having two internal oppositely-disposed clutch surfaces, two clutch members adapted to coact, respectively, with one or the other of said clutch surfaces, pinions of different diameters constantly connected with said clutch members, respectively, gears constantly connected together to rotate in unison and constantly in mesh with said pinions, respectively, a driven member connected to said gears, and a lever for moving said clutch members in unison to connect said rotatable element with one or the other of said clutch members.

11. In a power transmission device, the combination of a rotatable element having two internal oppositely-disposed clutch surfaces, two clutch members adapted to coact, respectively, with one or the other of said clutch surfaces, pinions of different diameters constantly connected with said clutch members, respectively, gearing constantly in mesh with said pinions, a lever, and means between said lever and said clutch members and operated by said lever for yieldingly holding one or the other of said clutch members in operative connection with said rotatable element.

12. In a power transmission device, the combination of a rotatable element having two internal oppositely-disposed clutch surfaces, a longitudinally-movable shaft in axial alinement with said rotatable element, a lever for moving said shaft longitudinally, clutch members mounted upon said shaft and movable longitudinally therewith, one of said clutch members being arranged to rotate with said shaft and the other to rotate independently thereof, said clutch members being adapted to coact, respectively, with one or the other of said clutch surfaces, pinions of different diameters constantly connected with said clutch members, respectively, and gearing constantly in mesh with said pinions.

13. In a power transmission device, the combination of a rotatable element having two internal oppositely-disposed clutch surfaces, a longitudinally-movable shaft in axial alinement with said rotatable element, clutch members mounted upon said shaft and movable longitudinally therewith, said clutch members being adapted to coact, respectively, with one or the other of said clutch surfaces, a lever for moving said shaft longitudinally, springs at opposite sides of said lever for yieldingly transmitting power from said lever to said shaft when the lever is moved in either direction from a neutral position, pinions of different diameters constantly connected with said clutch members, respectively, and gearing constantly in mesh with said pinions.

14. In a power transmission device, the combination of a rotatable element having two internal oppositely-disposed clutch surfaces, a longitudinally-movable rotary shaft in axial alinement with said rotatable element, longitudinally-movable ball-bearings supporting the end portions of said shaft, a lever for moving said shaft longitudinally, two clutch members mounted on said shaft and adapted to coact, respectively, with one or the other of said clutch surfaces, one of said clutch members being arranged to rotate with said shaft and the other being rotatable independently thereof, both of said clutch members being movable longitudinally with said shaft to operatively connect said rotatable element with one or the other of said clutch members, pinions of different diameters constantly connected with said clutch members, respectively, and gearing constantly in mesh with said pinions.

15. In a power transmission device, the combination of a rotatable element having two internal oppositely-disposed clutch surfaces, two clutch members adapted to coact, respectively, with one or the other of said clutch surfaces, means for moving said clutch members to connect said rotatable element with one or the other of said clutch members, spur pinions of different diameters constantly connected with said clutch members, respectively, and spur gears constantly connected together to rotate in unison and constantly in mesh with said pinions respectively.

16. In a power transmission device, the combination of a rotatable element having two internal oppositely-disposed clutch surfaces, two clutch members adapted to coact respectively with one or the other of said clutch surfaces, means for moving said clutch members to connect one or the other of said clutch members with said rotatable element, spur pinions of different diameters constantly connected with said clutch members, respectively, a countershaft, and spur gears carried by said countershaft and rotating in unison, said spur gears being constantly in mesh with said pinions, respectively.

17. In a power transmission device, the combination of a rotatable element having two internal oppositely-disposed clutch surfaces, two clutch members adapted to coact respectively with one or the other of said clutch surfaces, pinions connected to rotate in unison with said clutch members, respectively, gears mounted to rotate in unison with each other and meshing with said pinions, respectively, and means for moving one or the other of said clutch members into operative engagement with its clutch surface without disengaging either of said pinions from the gear meshing therewith.

18. In a power transmission device, the combination of a rotatable element having two internal oppositely-disposed clutch surfaces, two clutch members adapted to coact respectively with one or the other of said clutch surfaces, pinions connected to rotate in unison with said clutch members, respectively, gears mounted to rotate in unison with each other and meshing with said pinions, respectively, means for moving one or the other of said clutch members into operative engagement with its clutch surface without disengaging either of said pinions from the gear meshing therewith, and a driven member operated by said gears.

19. In a power transmission device, the combination of an endwise-movable shaft, a pinion rotating therewith, a clutch member connected to rotate with said shaft, a second clutch member mounted on and rotating independently of said shaft, both of said clutch members being arranged to move endwise with said shaft, a pinion connected to rotate with said second clutch member, said pinions being of different diameters, and a rotatable element having friction clutch surfaces adapted, respectively, to operatively engage one or the other of said clutch members when said shaft is moved endwise.

20. Power transmission mechanism, comprising a longitudinally-movable shaft, friction clutch members mounted thereon and movable longitudinally therewith, one of said clutch members being rotatable with said shaft and the other being rotatable independently thereof, a rotatable element having clutch surfaces adapted to operatively engage said clutch members, respectively, one of said clutch members being arranged to engage the coacting clutch surface when said shaft is moved longitudinally in one direction and the other of said clutch members being arranged to engage the coacting clutch surface when the shaft is moved longitudinally in the opposite direction, a pinion connected with one of said clutch members, a pinion of different diameter connected with said shaft, and gearing in mesh with said pinions.

21. Power transmission mechanism, comprising a longitudinally-movable shaft, friction clutch members mounted thereon and movable longitudinally therewith, one of said clutch members being rotatable with said shaft and the other being rotatable independently thereof, a rotatable element having clutch surfaces adapted to operatively engage said clutch members, respectively, one of said clutch members being arranged to engage the coacting clutch surface when said shaft is moved longitudinally in one direction and the other of said clutch members being arranged to engage the coacting clutch surface when the shaft is moved longitudinally in the opposite direction, a pinion connected with the independent clutch member, a pinion of different diameter connected with said shaft, gears constantly in mesh with said pinions, respectively, and a driven member operatively connected with said gears.

JOSEPH DAIN.

Copies of this patent may be obtained for five cents each, by addressing the "Commissioner of Patents, Washington, D. C."